United States Patent [19]
Fiedrich

[11] Patent Number: 5,707,007
[45] Date of Patent: Jan. 13, 1998

[54] HYDRONIC HEATING WITH CONTINUOUS CIRCULATION SUPPLYING MULTI-TEMPERATURE HEATING LOOPS

[76] Inventor: Joachim Fiedrich, 20 Red Pine Dr., Carlisle, Mass. 01741

[21] Appl. No.: 731,090

[22] Filed: Oct. 9, 1996

Related U.S. Application Data

[60] Provisional application No. 60/007,513, Nov. 22, 1995.
[51] Int. Cl.[6] ........................................ F24D 3/02
[52] U.S. Cl. ........................... 237/8 R; 237/63; 237/56
[58] Field of Search ........................ 237/63, 8 R, 56

Primary Examiner—Henry Bennett
Assistant Examiner—Derek S. Boles
Attorney, Agent, or Firm—Robert T. Dunn

[57] ABSTRACT

A hydronic heating system having a source of hot supply water and a reservoir of cooler return water, a main hot supply water circulation path (loop) from the supply water line to the return water line including a pump maintaining continuous flow of hot supply water through the main loop, a satellite injection water connection and a satellite return water connection along the main loop, a satellite distribution station including a satellite heating loop, a satellite supply header and satellite return header at opposite ends of the satellite heating loop and a satellite station pump having an input and an output for pumping satellite water from the satellite return header to the satellite supply header, whereby the satellite water flows through the satellite heating loop, a satellite injection water line from the satellite injection connection to the satellite pump input and a satellite return water line from the satellite pump output to the return connection along the main loop, whereby heat from the main loop flows to the satellite loop.

22 Claims, 8 Drawing Sheets

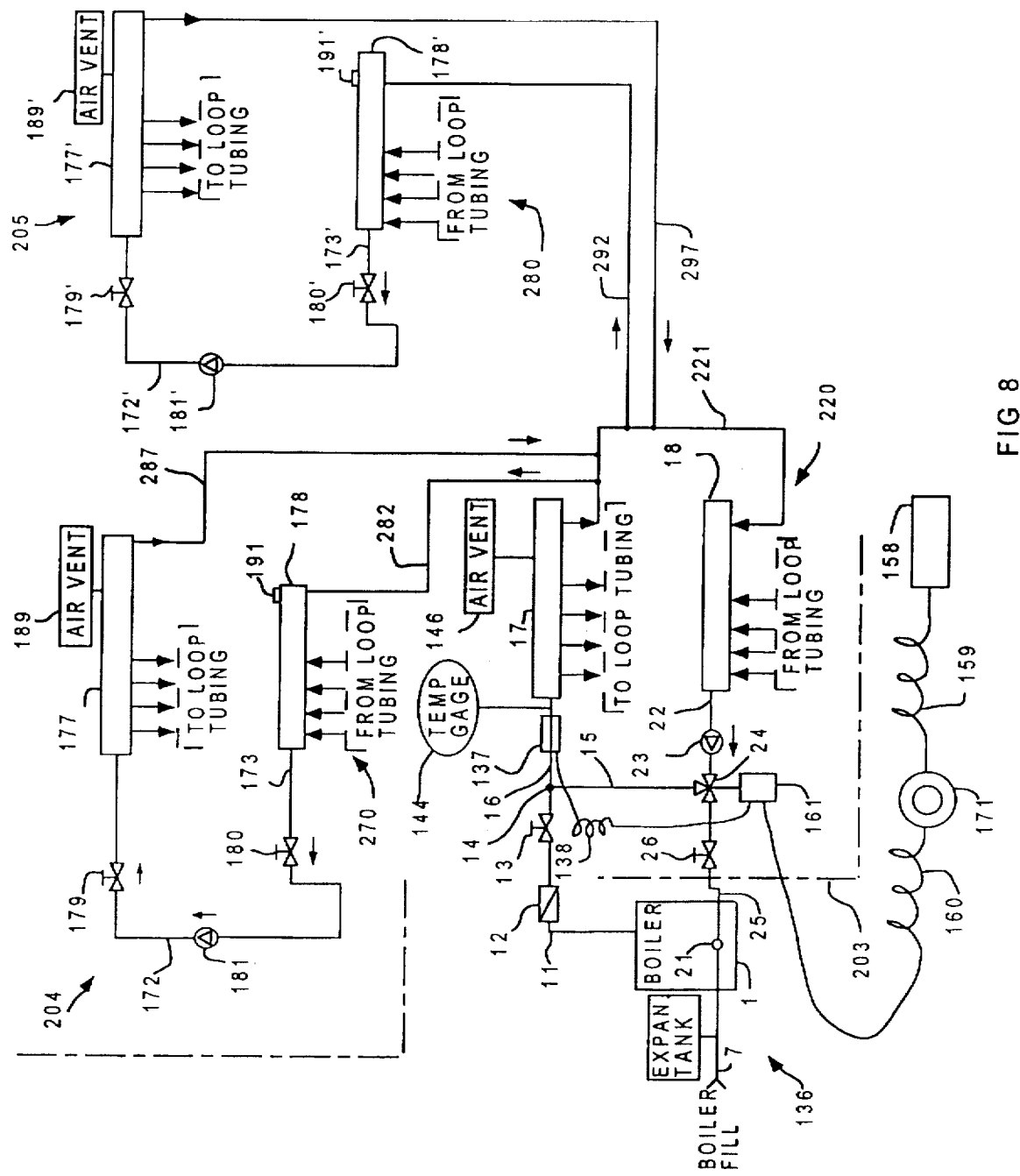

HYDRONIC HEATING WITH CONTINUOUS CIRCULATION SUPPLYING MULTI-TEMPERATURE HEATING LOOPS

BACKGROUND OF THE INVENTION

This application is a part of provisional application 60/007513 Nov. 22, 1995.

This invention relates to hydronic heating systems for dwellings, offices, etc. and more particularly to systems having one or more separate distribution stations feeding several kinds of heating loops requiring different temperature water and so providing multi-temperature heating loop operation.

Hydronic heating systems for heating the rooms in a dwelling, office, etc, are used widely in Europe and to a lesser extent in the United States. Water heated in a boiler is distributed to heating loops of tubing in the dwelling that carry the heat by radiation, conduction and convection to the rooms in the dwelling. A common technique provides a boiler hot water supply feeding the supply header of the distribution system for the heating loops and the boiler water return to which the system return header of the heating loops connects. The return water is heated in the boiler and sent out again to the distribution system as hot supply water, and so the water is cycled through the essentially closed system. One or more water pumps in this system keep the water flowing and valves control water flow rates through the loops depending on demand.

A heating loop may include several heating elements like baseboard finned tubing or wall mounted radiators that are the principal heat exchanger of the loop, or the tubing itself may be the principal heat exchanger of the loop. In the latter case the tubing is usually buried in the floor of a room and the tubing heats the floor. Often the tubing is buried in a special concrete and so heat exchange is principally by conduction and radiation to the concrete, which in turn heats the room by some conduction and convection, but principally by radiation. Hence, this type of heating is called Radiant Floor Heating (RFH). Similarly, when the tubing is buried in the wall, the heating is called Radiant Wall Heating (RWH).

In such RFH and RWH systems and other hydronic heating systems using baseboard finned tubing elements or wall mounted radiators, the supply water temperature from the boiler must be controlled so that it does not exceed certain limits that are substantially lower than the usual boiler supply water temperature. There are several reasons for this: first, the temperature of radiator elements on the wall must not be so high that they are not safe to touch; second, for RFH the floor temperature must not be uncomfortable hot; and third, where the tubing is plastic, the water temperature for some plastic materials must not exceed about 140° F.

In hydronic heating systems subject to such water temperature limitations, where the boiler is powered by burning fossil fuels, the boiler water supply temperature is usually well above 140° F. and often at about 180° F. to 200° F., and so the boiler supply temperature must be stepped down before it is fed to the heating loops.

In the past, it has been the practice to mix relatively cooler boiler return water with the hot boiler supply water to "dilute" the temperature of the supply water fed to the heating loops. An electrically controlled motorized three-way mixing valve has been used in the boiler supply line that feeds the supply header for the heating loops, between the boiler supply and the heating loops supply header. The mixing valve has two inputs and one output. One input is directly from the boiler hot water supply, the other input is from the return header of the heating loops and the output is directly to the supply header of the heating loops. The mixing valve motor is electrically energized by remote reset controls that sometimes respond to outside ambient temperature, inside room temperature, boiler water temperature, supply header water temperature, etc.

In an effort to reduce expense, non-motorized three-way valves have been used in the boiler supply line. Systems using non-motorized three-way valves with supply header water temperature feedback are described in the applicant's U.S. Pat. No. 5,119,988, which issued Jun. 9, 1992, entitled: "Hydronic Heating Water Temperature Control System". That patent describes several hydronic heating systems with a non-motorized (non-electric) three-way valve having supply water temperature feedback to the valve controller. In the preferred system, the valve is a three-way diverting valve in the boiler return water line. The diverting valve has one input and two outputs and diverts water from the return line (on the way from the heating loop return header to the boiler return), to the boiler supply line that feeds the loop supply header, diluting the supply water (reducing its temperature) that is fed to the heating loop supply header.

That patent also teaches use of a non-electric thermostatic actuator head attached to the diverting valve for positioning the valve stem and controlled by a capillary temperature sensor. Thus, the valve is modulated by non-electric feedback of the diluted supply water temperature. The bulb of the capillary sensor is inserted into the diluted supply water or it may be clamped to the supply line next to the supply header so that it is at the temperature of water in the supply header. Capillary fluid in the bulb expands with temperature applying a pressure force through the capillary to the actuator head and so the valve is modulated to increase or decrease the flow of return water through the valve as necessary to maintain the temperature of the heating loop supply header water at or below a predetermined value. That value can be set by a mechanical setting on the actuator head and so an accurate reading of the supply header water temperature is made continuously and simultaneously any deviation from the setting is immediately nulled by modulating the valve.

RFH and RWH systems using embedded plastic tubing and other hydronic heating systems using wall radiators and/or baseboard finned tubing elements are some of the different kinds of heating loops. Clearly, the temperature limitation of a heating loop depends first on how and where the loop is installed, creature comfort and the materials in the loop. As the term "kind" of loop is used herein, it means the temperature requirements and limitations of the loop and so loops of the same kind have the same temperature requirements and limitations. For example: the temperature of baseboard finned tubing radiator elements can be quite high, because they are metal tubes, can be shielded and are not usually touched, even accidentally, whereas wall radiators are not shielded and must not be too hot to touch; for RFH where the tubing is beneath the floor boards, the tubing can be hotter than where the tubing is on top of the floor boards; for RWH the tubing is covered by only thin gypsum board and so must be well below 100° F.; and even the best cross-linked plastic tubing should not be exposed to water above 140° F.

Where the hydronic system with a three-way thermostatically controlled diverting valve in the return line for diluting the supply water temperature (as described above) is also responsive to outdoor temperature an outdoor temperature

3 bulb sensor, a thermostatic valve actuator attached to the valve with capillary tubes connecting the common thermostatic fluid from the bulbs to the actuator are included so that loop water temperature is increased when outdoor temperature falls. The applicant has invented such a system, which is described in his U.S Pat. No. 5,556,027, issued Sep. 17, 1996, entitled: "Hydronic Heating Outdoor Temperature Reset Supply Water Temperature Control System".

Since the temperature of boiler supply water fed to the main distribution station is usually well above 140° F. and often at about 180° F. to 200° F., the boiler supply water temperature may be alright for some "kinds" of heating loops like baseboard finned copper tubing, but must be much lower for other "kinds" of heating loops like RFH and RWH. The present application describes techniques and systems that provide several echelons of temperature ranges of loop supply water to accommodate the requirements of different "kinds" of heating loops in a premises.

The applicant has invented a hydronic heating with satellite distribution stations that operate at lower temperatures for multi-temperature heating loop operation. That invention is described in the applicant's co-pending U.S. patent application Ser. No. 324,232, filed Oct. 17, 1994, entitled: "Hydronic Heating With Satellite Distribution Stations For Multi-Temperature Supply Water To Heating Loops". That invention is also described in the applicant's copending U.S. patent application Ser. No. 08/666,911, filed Jun. 20, 1996, entitled: "Hydronic Heating With Satellite Distribution Stations For Multi-Temperature Supply Water To Heating Loops". Those patent applications describe a complete main distribution system (main station) with main supply and return headers, one or more main heating loops, a main circulation pump and a main three-way dilution control valve and feedback controls for the valve; each satellite station includes a complete satellite distribution system that has satellite supply and return headers, satellite heating loops and a satellite circulation pump; and water from the main supply header is injected into the satellite return header to add heat to the satellite station. Water flow between the main and satellite stations is balanced by a return of injected water from the satellite supply header to the main return header. Several techniques of modulating the heat flow to the satellite are disclosed in that patent application, including a modulating valve in the injection line or in the balancing return line between the main and satellite systems.

Where several such satellite stations are fed from the main station, as described in the applicant's aforementioned patent applications Ser. Nos. 324,232 and 666,911, heat (hot water) injection into each satellite is from the main supply header to the satellite return header and water flow is balanced by a return from the satellite supply header to the main return header. Thus, the satellites are in parallel with each other, as they all connect to the main at the same point and all return to the main at the same point, and the main and each satellite station has a complete distribution system with headers, a pump and station water temperature control.

The present invention also provides multi-temperature satellite heating loops, however the satellites are in series and individual satellite water temperature control can be affected without main water temperature control using a two-way valve that responds to the satellite return to the main water temperature and controls the satellite injected from the main water flow (injected heat). Thus, the present invention provides multi-temperature satellite heating loops with substantially fewer components than the systems described in the applicant's aforementioned patent applications Ser. Nos. 324,232 and 666,911.

4

SUMMARY OF THE INVENTION

It is an object of the present invention to provide a hydronic heating system for dwellings, offices, etc., having several echelons of temperature ranges of loop supply water to accommodate the requirements of different kinds of heating loops.

It is another object to provide a hydronic heating systems for dwellings, offices, etc., having one or more satellite distribution stations feeding heating loops lower temperature supply water and so providing multi-temperature heating loop operation.

It is another object to provide such a hydronic heating system that is relatively less expensive than prior systems of equivalent capacity and which avoids some of the limitations and disadvantages of the prior systems.

It is another object to provide a hydronic heating system with two or more ranges of supply water temperature that is satisfactory to avoid feeding excessively high temperature boiler supply water to the system different kinds of heating loops.

It is another object to provide such a hydronic heating system with heating loop supply water temperature control that can be readily adjusted to change the desired water temperature feeding the system different kinds of heating loops.

It is another object to provide such a hydronic heating system with controls for heating loop supply water temperature that can be readily adjusted to change the desired water temperature feeding the system heating loops of different kinds, such as baseboard heaters, wall heaters, RFH tubing, RWH tubing and outdoor ice and snow melting.

It is a particular object to provide a hydronic heating system with a main station requiring no more than a pump circulating water from a boiler supply back to the boiler return, feeding one or more satellite distribution stations that operate at lower water temperatures to accommodate the requirements of different kinds of heating loops and respond to outside ambient temperature.

It is a further object to provide an interchangeable modular unit for the satellite distribution stations that injects hot water from the main system, pumps and mixes the satellite water and return water to the main.

It is a further object to provide such an interchangeable modular unit for the satellite distribution stations that also automatically controls the flow rate of the injected hot water depending on the temperature of the satellite water.

According to the present invention a main constant circulation system is a water line (loop) containing a main pump circulating hot supply water from a boiler to the boiler return reservoir. Along the main loop are one or more satellite distribution systems each with a pump, one or more heating loops, supply and return headers, an injection line from the main loop and a return line to the main loop and the satellite distribution systems are in series along the main loop.

The pump in a satellite system is located strategically in the satellite system so that the satellite system functions as a 4-way mixing valve with the injection line feeding the suction side of the pump and the return and supply header on the discharge side of the pump. This allows the pump to take on the function of a 3-way or a 4-way mixing valve within the main constant circulation system, eliminating mixing valves and, yet providing total modulation of the satellite water temperature and water flow rate. The applicant is able to provide this control with a less complicated lower cost system incorporating the present invention.

Several such satellite systems in series along the main loop are relatively easily installed, as each satellite is fed by a relatively small diameter injection line anywhere along the main loop and returns water to the main loop just downstream thereof by a relatively small diameter return line. Such satellite systems can be located anywhere in the premises it is convenient, any number of such satellite systems can be connected to the main loop, there is no hydraulic cross-feeding or interference between the satellite systems or the main system and common problems that arise where 3-way or 4-way mixing valves are used are completely avoided. The main constant circulation system becomes, in a sense, "neutral" forming a sort of "hydraulic switch" function from which each satellite system can draw heat (hot water) and return cooler water without backfeeding into the other satellite systems.

In preferred embodiments of the present invention a main or front end circulation system is provided at the location of the hot water supply (the boiler) in the premises and feeds two or more satellite stations connected in series with each other along the main circulation system, each satellite station being capable of operating at a temperature selectably set at the station, each having its own circulation system and each having its own distribution system and heating loops to other parts of the premises.

Also in preferred embodiments the satellites include an interchangeable modular unit for automatically controlling the flow rate of the injected hot water depending on the temperature of the satellite water and the modular unit includes an isolation valve that enables turning on the particular satellite without turning on the rest of the satellites and without turning on the main system pump.

These and other features of the present inventions are revealed by the following description of embodiments of the inventions taken in conjunction with the figures.

DESCRIPTION OF THE DRAWINGS

FIG. 8 is a schematic diagram of a hydronic heating system similar to FIG. 2 that has: a main distribution station with main supply header water temperature dilution using a diverting valve in the boiler return line, by a thermostatic actuator head and thermostatic control system that responds to outside ambient temperature and several main station heating loops; one of the main station heating loops feeds two satellite stations in series; and each satellite has supply and return headers feeding several satellite heating loops and a satellite water temperature limit control.

DESCRIPTION OF EMBODIMENTS OF THE INVENTION

An advantage of the present invention is that only one main circulation loop operated at constant flow rate is required for several relatively low cost satellite stations each having its own circulation system that feeds has one or more heating loops that operate at lower temperatures than the main system. This is a desirable system for heating a premises such as a dwelling and especially for RFH and RWH systems with multiple types of finish floor coverings (carpet/tile/wood flooring) or systems with multiple kinds of radiation (baseboard finned radiator elements, wall radiators, RFH or RWH heating).

Other advantages of the present invention are that: one or more of the satellite stations can be turned on without turning on all of them; a single satellite station can be turned on without turning on the main system pump; a satellite station supply and return headers can be located in the room of the premises that is heated by the satellite heating loops and so the loop flow rate controls can be set in the room directly manually and the headers can be serviced in the room; and the satellite stations, except for the number of heating loops each feeds, can be comprised of interchangeable modular units that are identical in construction.

Such a modular unit for each satellite station includes: a short section of the main circulation loop in which there is the satellite isolation valve; injection and return T fittings at the ends of the short section; satellite injection and return pipes from the T fillings; a satellite pump; an injection T connection from the injection pipe to the pump; a return T connection from the pump to the return pipe; accommodations on said T connections for connecting suitable satellite headers thereto; automatic satellite water temperature control and means for limiting injected hot water flow from the main (injected heat).

The satellite circulation pump insures that the required water flow rate through the satellite heating loops is maintained and also functions as a mixing device to mix the satellite loop water return with the higher temperature injected water from the main loop.

Heat flow from the main to a satellite is metered (modulated) at the injection point or the return point in the satellite system and aids in fine tuning the temperature differential between the satellite station heating loops and the main loop. This metering can be by an electric or thermostatic, two-position or modulated, injected flow control valve in the satellite injection line or the satellite return line and provides for individual satellite water temperature control. This control valve in the satellite system, in effect, controls the rate of flow of main supply water to the satellite and so it controls the heat flow rate from the main to the satellite.

Figure 1:
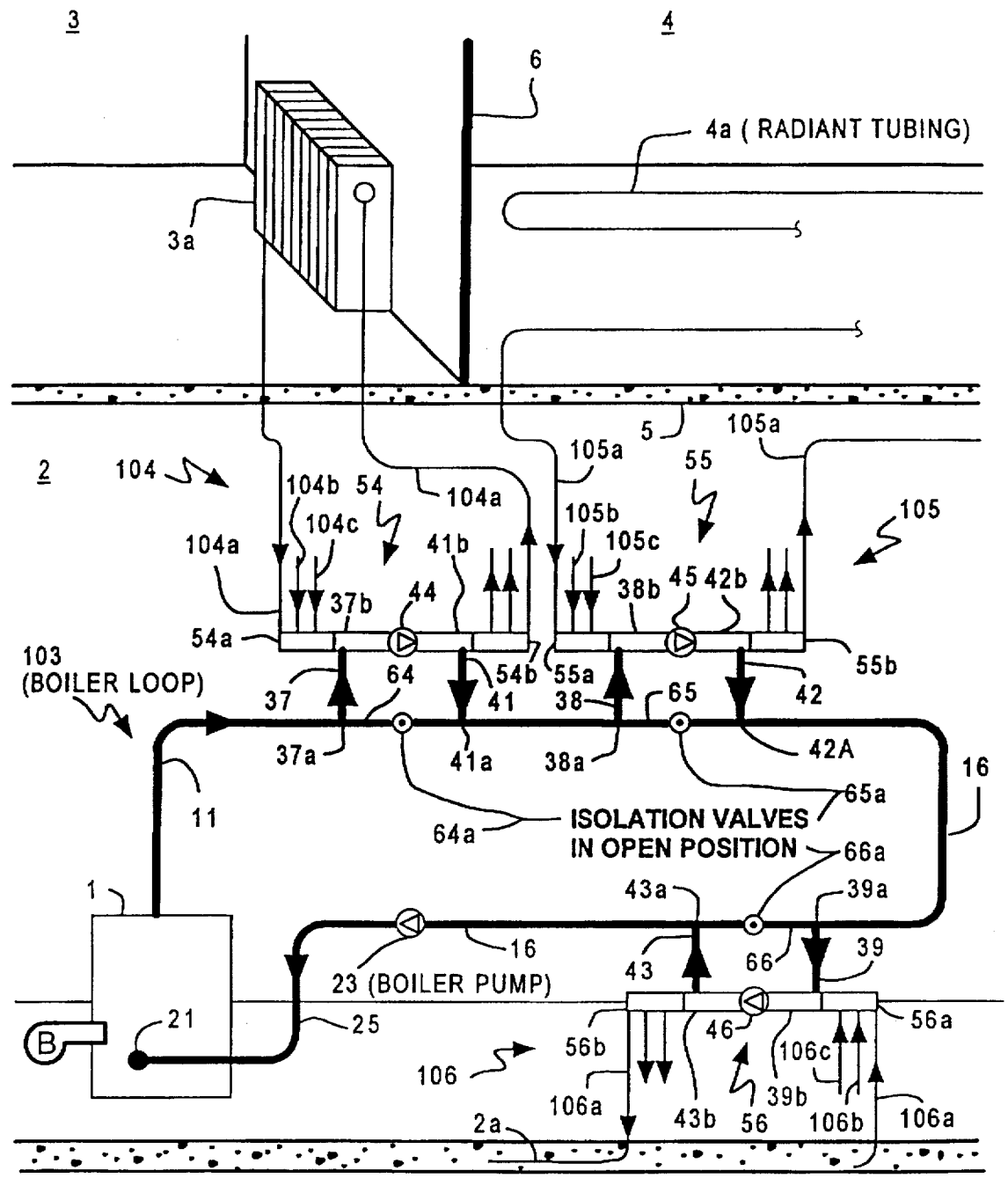
FIG. 1 is a schematic diagram of a hydronic heating system in a premises with a main constant circulation system in the premises basement where the hot water boiler is located feeding three separate satellite stations in series, each satellite station having at least one heating loop of a kind that requires lower water temperature than fed to the main and some of which heat rooms of the premises above the basement.

In one embodiment (FIG. 6), which is similar to FIG. 1, there are two satellite stations in series with the main loop, each satellite having supply and return headers feeding several heating loops and insertion water flow control by a modulated valve in the satellite return line to the main that responds to the satellite supply header water temperature;

In another embodiment (FIG. 7), which is also similar to FIG. 1, the satellite station insertion water flow control is by a modulated valve in the insertion line from the main that responds to the satellite supply header water temperature and outside ambient temperature.

Figure 2:
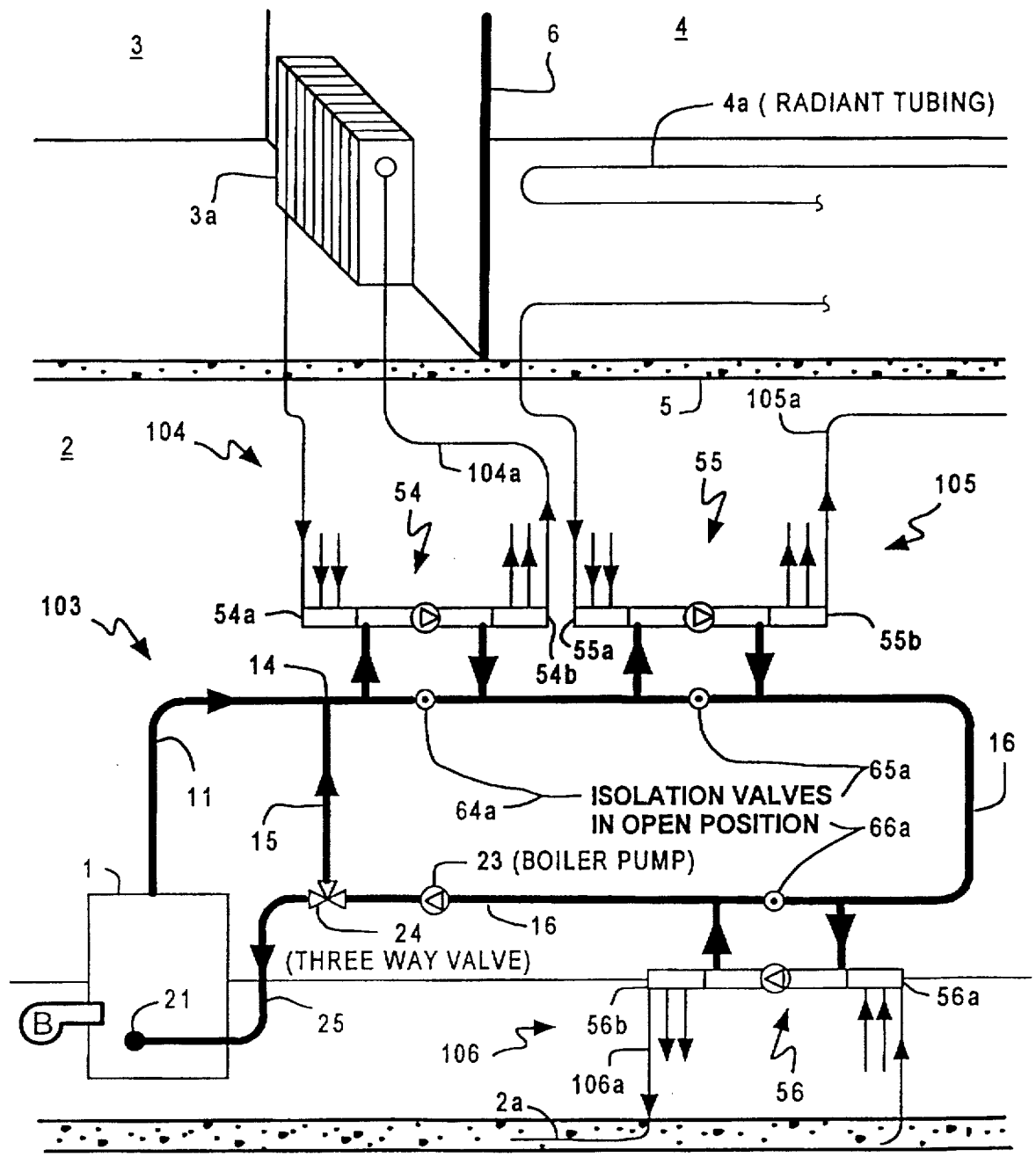
FIG. 2 is a schematic diagram of a similar hydronic heating system in which the main circulation system has water temperature modulation by dilution from a three-way diverting valve in the main return line.

In another embodiment (FIG. 8), which is similar to FIG. 2, the main is a complete distribution station with a main pump, main supply and return headers feeding a plurality of main heating loops and supply water temperature dilution and feedback control with temperature feedback from the main supply header water as a function of outdoor ambient temperature and means for selecting the function and setting the desired loop supply header water temperature. Details of such a main supply header water temperature control are described in the applicant's aforementioned co-pending U.S. patent applications Ser. Nos. 529,938 and 324,232.

Simple Main Constant Flow Circulation Loop Feeding Satellites In Series

Turning first to FIG. 1 there is a schematic diagram of a typical hydronic heating system installed in a dwelling incorporating a main constant circulation system that feeds three separate satellite constant circulation stations in series, each satellite station having one or more heating loops of a kind that requires lower water temperature than the main according to a predetermined temperature limit. This system in a premises such as a dwelling includes in the basement 2 a boiler 1 that supplies the main circulation loop (the boiler loop) 103 and its three satellites 104, 105 and 106. It may also supply the dwelling domestic hot water (DHW) tank (not shown). The usual requirement of the system is to provide DHW water at about 180° F. to 200° F., which is the usual hot water temperature requirement for washing machines and dish washers and the same boiler supply also feeds the main loop 103.

The main circulation loop 103 accepts supply water at the high temperature 180° F. and includes the boiler supply line 11 that may includes a unidirectional check valve and an isolation ball valve (not shown in this figure) and the main circulation loop pipe 16 At the other end of loop 103 a similar tubing connection is provided to the boiler return reservoir 21 includes main water pump 23, boiler return line 25 and may include another isolation ball valve in the return line.

Satellite stations 104, 105 and 106: are fed main water by injection lines 37, 38 and 39, they return water to the main by lines 41, 42 and 43 and they are driven by continuous pumps 44, 45 and 46, respectively.

The interchangeable modular units of satellite stations 104, 105 and 106 are modular units 54, 55 and 56, respectively. Such a satellite station modular unit is shown enlarged in detail in FIG. 5.

Figure 5:
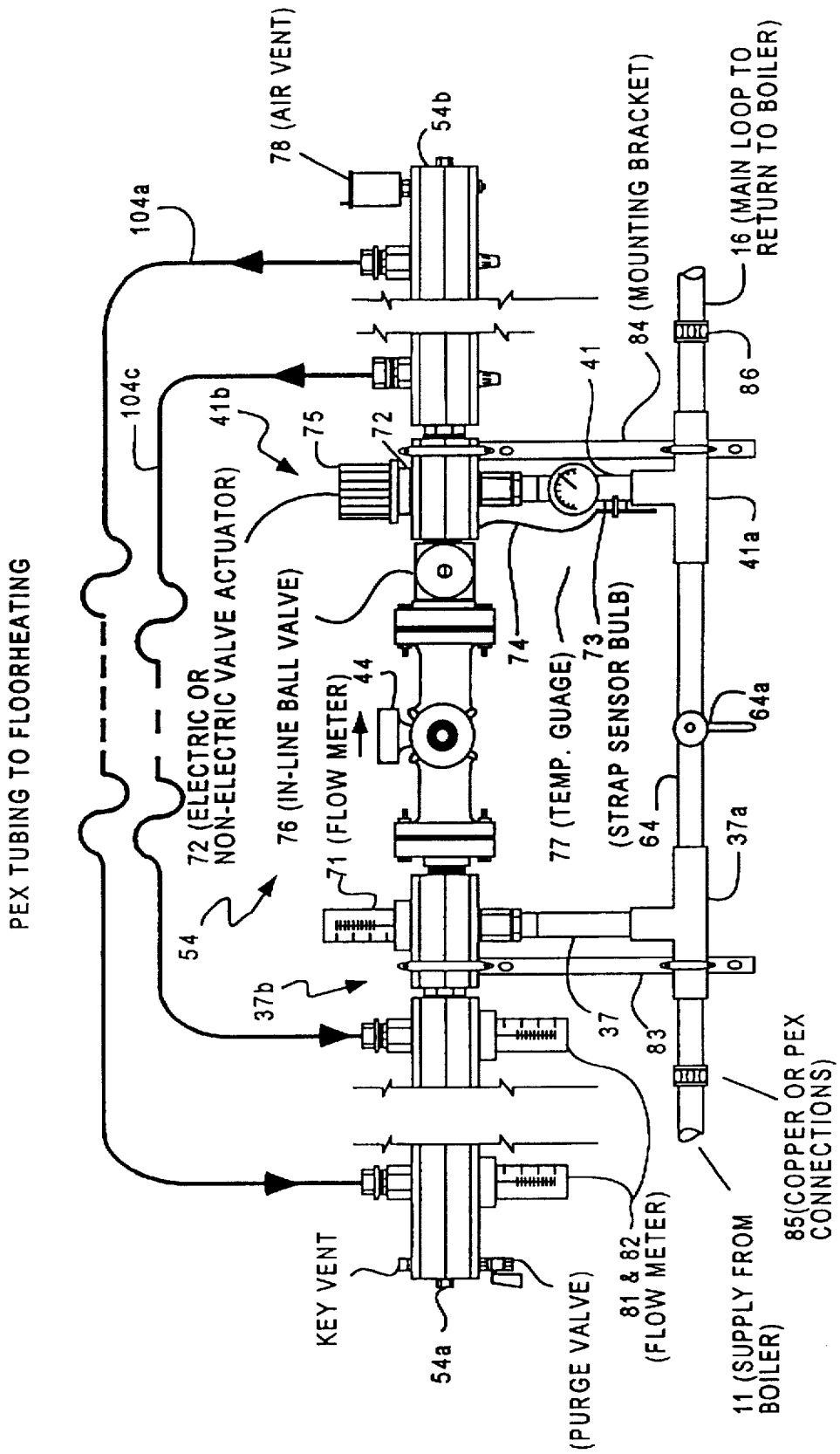
FIG. 5 is an enlarged front view of the satellite station interchangeable modular unit with the satellite supply and return headers attached that feed the satellite heating loops, the modular unit being equipped with automatic satellite injected water flow (injected heat flow) and satellite loop water temperature control and an isolation valve.

Station 104 modular unit 54 includes: a short pipe section 64 of the main circulation loop in which there is the satellite isolation valve 64a; injection 37a and return 41a T fittings at the ends of the short section; satellite injection pipe 37 and return pipe 41 from the T fittings 37a and 41a, respectively; the satellite pump 44; an injection T connection 37b from the injection pipe to the pump; a return T connection 41b from the pump to the return pipe; accommodations on said T connections for connecting suitable satellite return 45a and supply 54b headers thereto; and automatic satellite water temperature control and means for limiting injected hot water flow from the main (injected heat) are also provided as parts of the T connections 41b and 37b and described more fully hereinbelow with respect to FIG. 5.

Similarly for station 105 modular unit 55 includes: a short pipe section 65 of the main circulation loop in which there is the satellite isolation valve 65a; injection 38a and return 42a T fittings at the ends of the short section; satellite injection pipe 38 and return pipe 42 from the T fittings 38a and 42a, respectively; the satellite pump 45; an injection T connection 38b from the injection pipe to the pump; a return T connection 42b from the pump to the return pipe; accommodations on said T connections for connecting suitable satellite return 55a and supply 55b headers thereto; and automatic satellite water temperature control and means for limiting injected hot water flow from the main (injected heat) are also provided as parts of the T connections 42b and 38b and described more fully hereinbelow with respect to FIG. 5.

Similarly for station 106 modular unit 56 includes: a short pipe section 66 of the main circulation loop in which there is the satellite isolation valve 66a; injection 39a and return 43a T fittings at the ends of the short section; satellite injection pipe 39 and return pipe 43 from the T fittings 39a and 49b from the injection pipe to the pump; a return T connection 43b from the pump to the return pipe; accommodations on said T connections for connecting suitable satellite return 56a and supply 56b headers thereto; and automatic satellite water temperature control and means for limiting injected hot water flow from the main (injected heat) are also provided as parts of the T connections 43b and 39b and described more fully hereinbelow with respect to FIG. 5.

Satellite stations 104, 105 and 106 each have a supply header and a return connected to the modular unit thereof so that water flow to the supply header is driven by the station pump and the pump input includes return water from the return header and injected hot water from main loop 103 that are combined and mixed in the pump raising, in effect raising the temperature of the return water which is pumped to the supply header.

The supply header and return header in each satellite station has connections for one or more heating loops that heat rooms in the premises. For example, satellite station 104 modular unit 54 has connected thereto return header 54a and supply header 54b that feeds heating loops 104a, 104b and 104c. Of these, heating loop 104a feeds a wall radiator 3a in room 3 above the basement 2. The other heating loops 104b and 104c are represented only by connections to the supply and return headers and may heat other rooms in the premises.

For satellite station 105, modular unit 55 has connected thereto return header 55a and supply header 55b that feeds heating loops 105a, 105b and 105c. Of these, heating loop 105a feeds radiant tubing 4a in the floor of room 4 above the basement 2. The other heating loops 105b and 105c are represented only by connections to the supply and return headers and may heat other rooms in the premises.

For satellite station 106, modular unit 56 has connected thereto return header 56a and supply header 56b that feeds heating loops 106a, 106b and 106c. Of these, heating loop 106a feeds radiant tubing 1a in the floor of the basement 2. The other heating loops 106b and 106c are represented only by connections to the supply and return headers and may heat other rooms in the premises.

In any of the satellite stations, the modular unit return T connection may include a temperature limit valve that is pre-set to close when the temperature of the satellite water flow from the pump exceeds a predetermined value medium temperature for or low temperature as compared with the main circulation system boiler supply temperature which is high temperature. For example, when the main boiler supply (high temperature) is 180° F., medium may be 135° F. and low may be 90° F. Also in any of the satellite stations the injection T connection may include an injection water flow limit device as described more fully herein below with reference to FIG. 5.

Main Constant Flow Circulation Loop Feeding Satellites In Series And Variable Temperature Controls On The Main FIG. 2 shows the same hydronic heating system as shown in FIG. 1 with the addition of supply water temperature control in the main boiler loop 103 by, for example, dilution using a three-way diverting valve 24 in the return line 25 of the main loop 103 that diverts some of the cooler main return water to the main loop supply line 11, via diverted water line 15 and T fitting 14 in the supply line 11.

As mentioned hereinabove, use of a diverting valve in the return line to control or reduce the temperature of the supply water from a boiler is described in the inventor's aforementioned U.S. Pat. No. 5,119,988. An embodiment of the present invention incorporating this control is described in detail hereinbelow with reference to FIG. 8.

Figure 3:
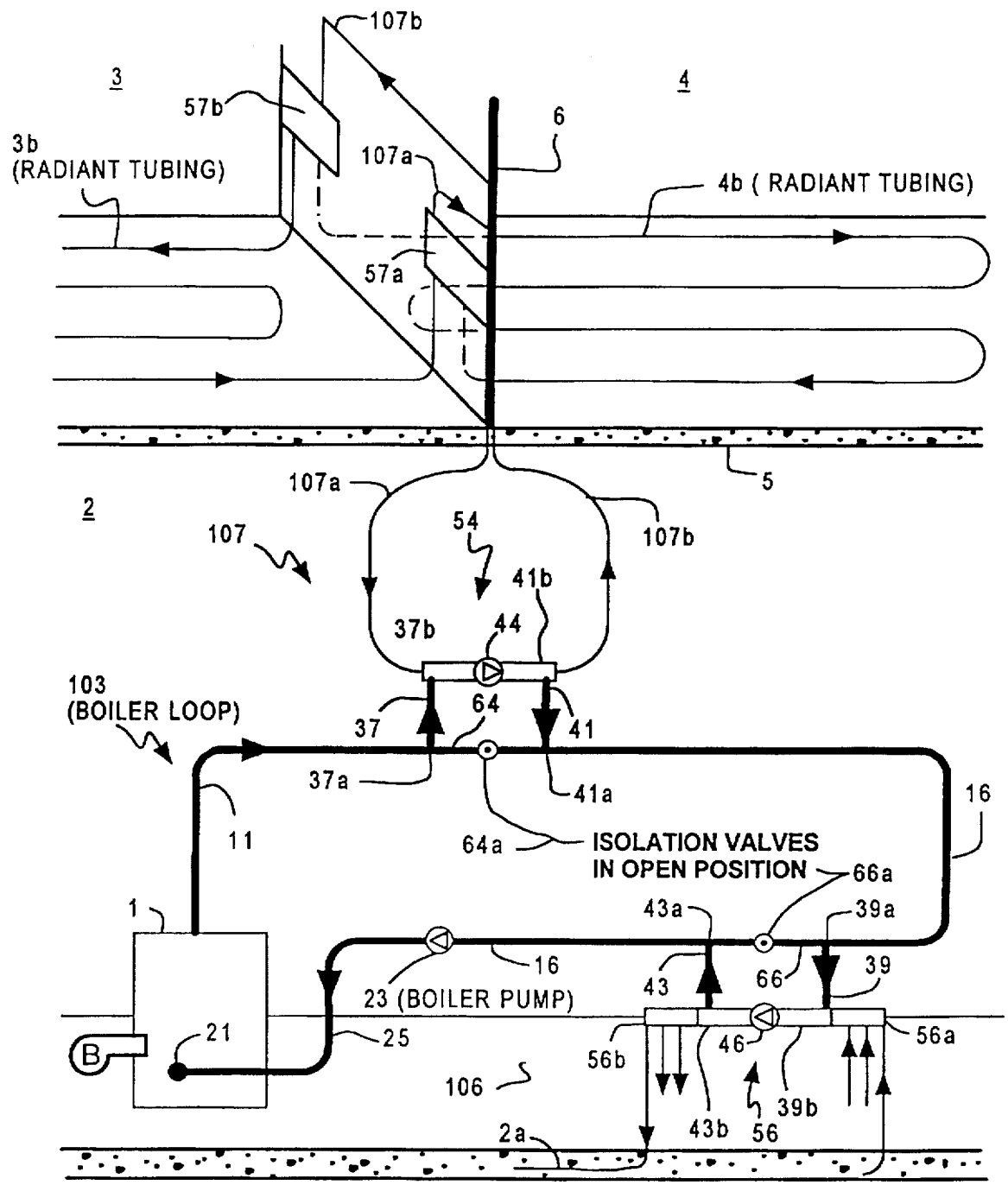
FIG. 3 is a schematic diagram of a hydronic heating system similar to FIG. 1 wherein the supply and return headers of a satellite station are located in a room above the basement and feed heating loops to those rooms.

Main Constant Flow Circulation Loop Feeding Satellites In Series With A Satellite Headers Remotely Located FIG. 3 shows the same hydronic heating system as shown in FIG. 1, without satellite station 105 and with satellite station 104 replaced by satellite station 107. In satellite station 107 the supply and return headers are located in the rooms 3 and 4 above the basement 2. In this embodiment, satellite station 107 includes the same modular unit 54 as station 104 shown FIG. 1 and described in detail hereinbelow with reference to FIG. 5. That modular unit includes injection T connection 37b and return T connection 41b. From these T connections return header tube 107a and supply header tube 107b extend upward from the basement 2 through the floor 5 of rooms 3 and 4 above the basement to return and supply headers 57a and 57b, respectively, in the wall 6 between rooms 3 and 4. More particularly, tube 107b from return T connection 41b feeds mixed (heated) water from pump 44 to supply header 57b in the wall 6 and tube 107a to injection T connection 37b feeds return water from return header 57a to be mixed in pump 44 with injected hot water through pipe 37 from the main boiler loop 103.

Heating loops in the floors of rooms 3 and 4 from supply header 57b to return header 57a include radiant tubing loop 3b in the floor of room 3 and radiant tubing loop 4b in the floor of room 4.

Main Circulation Loop Feeding A Single Satellite

Figure 4:
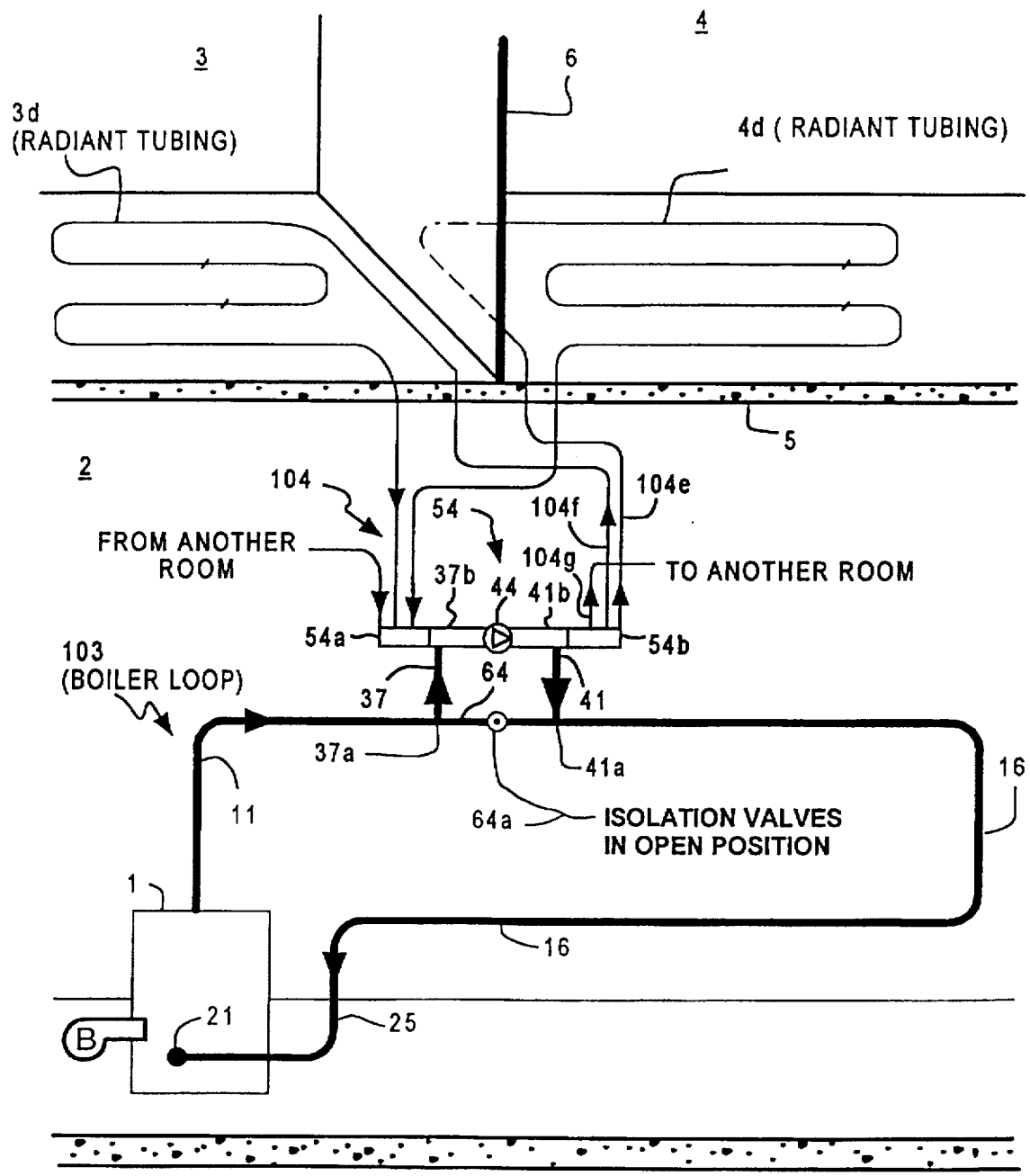
FIG. 4 is a schematic diagram illustrating operation of a system such as shown in FIG. 1 with only one satellite station turned on, the main system pump turned off and the one satellite station isolation valve closed, as may be done during times when minimum heating of the premises is desired.

FIG. 4 illustrates an operation of the hydronic system shown in any of the FIGS. 1 to 3 wherein only one of several satellite stations is turned on. This may be sufficient for the premises during late spring or early fall seasons when the demand for heat in the premises is low. In this example shown in FIG. 4 only satellite station 104 is turned on by simply turning on pump 44 of the station modular unit 54 and of course the boiler is turned on so that hot water is supplied in line 11. Since other satellite stations are not turned on in this example, they are not shown in FIG. 4. In addition, the main boiler loop pump 23 is not turned on and so it is not shown in FIG. 4. For this operation, isolation valve 64a of the modular unit is closed and so flow in the total system is compelled only by the satellite pump 44.

In operation, injected water from the boiler in injection pipe 37 flows into pump 44 along with return water from return head 54a and these flows are mixed in the pump and depending on the modulated temperature responsive control valve in return T connection 54b, some of the pump output is fed to supply header 54b and the rest is returned by return pipe to main line 16 and boiler return line 25 to the boiler for reheating.

Supply header 54b feeds the satellite heating loops 104e, 104f and 104g. Loop 104e goes through floor 5 into radiant tubing 4d in the floor of room 4. Loop 104f goes through floor 5 into radiant tubing 3d in the floor of room 3 and loop 104g feeds another heating loop in another room not shown.

Interchangeable Modular Unit

FIG. 5 is an enlarged detailed view of a modular unit such as 54, 55 or 56. For purposes of description the drawing shows modular unit 54 of satellite station 104.

The modular unit 54 includes a section of pipe 64 that connects by injection T fitting 37a to the main boiler loop supply line 11 and by return T fitting 41a to the boiler loop 103 line 16 that feeds the return line 25 to the boiler. From injection T filling 37a, injection pipe 37 connects to injection T connection 37b that connects on one side of the T to the input of pump 44 and on the other side accommodates attachment of return header 54a. From return T filling 41a, return pipe 41 connects to return T connection 41b that connects on one side of the T to the output of pump 44 and on the other side accommodates attachment of supply header 54b.

Injection T connection 37b contains a flow limiting device for the injection flow of hot water from the boiler. This device is a flow meter 71 that has a stop that is set to limit the injection flow into the satellite system.

Return T connection 41b contains a two-way return flow control valve 72 for modulating the flow of return water through pipe 41 from the satellite system to the main boiler loop 103, depending on the temperature of the return water in pipe 41. For that purpose, a thermostatic bulb 73 through its capillary tube 74 connects to thermostatic valve actuator 75 that is attached to and modulates valve 72 are provided. Bulb 73 is strapped to return pipe 41 in intimate thermal contact therewith and so the thermostatic fluid in the bulb, capillary and actuator expands or contracts as the temperature of the return water in pipe 41 increases or decreases and the actuator closes or opens valve 72 to reduce or increase injected hot water flow and so heat flow to the satellite station is reduced or increased.

In-line ball valve 76 is provided to manually restrict flow from the pump. Visual thermometer gage is attached to return pipe 41 in thermal contact therewith to provide a visual reading of return water temperature. An air vent 78 is provided in supply header 54b and a purge valve 79 is provided in return header 54a.

Optional flow meters 81 and 82 in return header 54a can be set to limit the flow through heating loops 104a and 104c, respectively. Setting flow meters 81 and 82 sets the ratio of flows through loops 104a and 104c.

Mounting brackets 83 and 84 provide means for mounting modular unit 54 to a wall or other support.

In operation with other satellite stations turned on, isolation valve 64a is open(turned with the handle thereof parallel to pipe 64), the main boiler loop pump is turned on and the satellite pump is turned on. Flow through loops 104a and 104c is limited by flow meters 81 and 82, injected hot water flow is limited by flow meter 71 and return water flow is modulated by thermostatically controlled valve depending on return water temperature and the setting of the valve thermostatic actuator 75.

If return water temperature is lower than called for by the setting of actuator 75, valve opens allowing more hot injected water flow into the satellite station up to the limit set by flow meter 71. The injected hot water is mixed with the satellite loop return water from return header 54a in pump 44 and fed to supply header 54b from which it is distributed to loops 104a and 104c.

On the other hand if return water temperature is higher than called for by the setting of actuator 75, valve 72 closes reducing injected hot water flow into the satellite station.

The modular unit 54 and the modular units of other satellite stations are preferably the same and so may be interchangeable. For each installation the flow meters and thermostatic actuator are set depending on the heating loops they feed and the requirements and limitations of those loops. Since each satellite station modular unit has an isolation valve, any one of them can be operated alone without requiring the main boiler loop pump to be turned on.

A modular unit such as 54 is connected to the main boiler loop 103 by copper or PEXTRON tubing connectors 85 and 86 of T fittings 37a and 41a, respectively.

Figure 6:
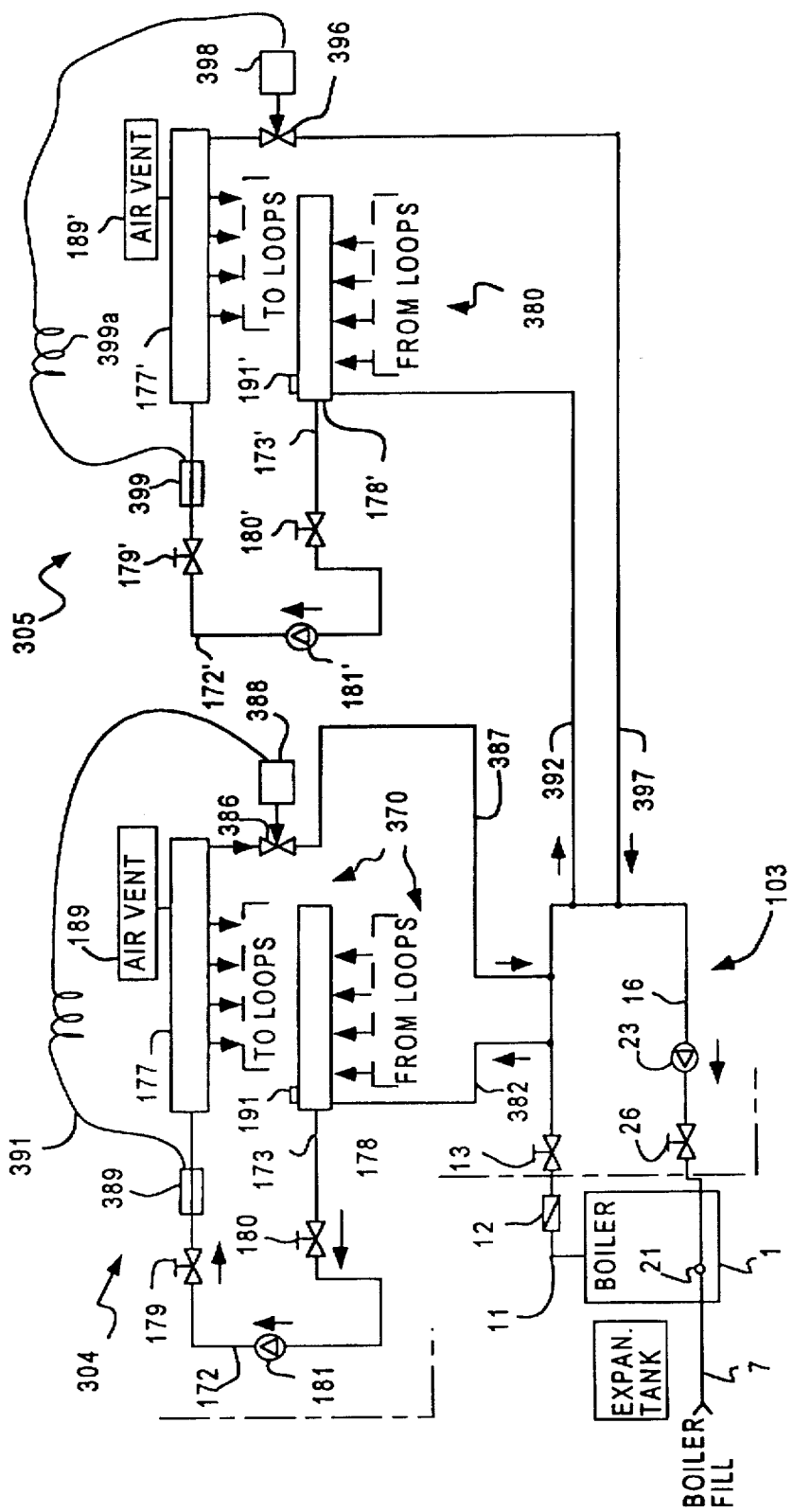
FIG. 6 is a schematic diagram of a hydronic heating system similar to FIG. 1 that has: two satellite stations in series with the main loop, each satellite having supply and return headers feeding several heating loops and insertion water flow control by a modulated valve in the satellite return line to the main that responds to the satellite supply header water temperature.

Main Constant Flow Circulation Loop Feeding Satellites In Series And Temperature Limit And Modulated Feedback Temperature Controls On Satellites As shown in FIG. 6, the main circulation loop 103 is the same as in FIGS. 1 and 3.

The satellite distribution stations 304 and 305 in this embodiment may be the same except for operation. Satellite 304 may be set for medium temperature, as compared to the main which operates at high temperature and station 205 may be set for low temperature. For example, when high temperature is 160° F., medium may be 120° F. and low may be 80° F.

Satellite 304 set for medium temperature has a supply header 177 and return header 178 with tubing connections to loops 370. The circulation system for this satellite includes return header line 173 from return header 178, isolation ball valve 180 to the low pressure side of pump 181 and from the high pressure side of the pump supply line 172 through isolation ball valve 179 to supply header 177. This maintains continuous circulation of the satellite station water between the headers through loops 370.

The temperature of water in satellite 304 supply header 177 is maintained at the medium level (120° F.) by the controlled flow of high temperature (160° F.) water from main loop 16 via satellite injection line 382 that feeds from main loop 16 to satellite 304 return header 178. A flow meter 191 on the return header 178 at line 382 acts as a balancing valve for fine tuning the injected flow rate of high temperature water from the main loop. This feed of high temperature water into the satellite station is sometimes referred to as BTU water injection.

The primary control of the flow of injected high temperature water into satellite station 304 from the main loop is in the satellite return line 387. It is from the satellite supply header 177, via thermostatically controlled two-way modulating valve 386 and return line 387 to the main loop 16. Valve 386 is modulated by thermostatic actuator head 388 that is controlled by the temperature of capillary sensor bulb 389 via capillary line 391 from the bulb to the actuator. The bulb is thermally attached to the line 172 into the satellite supply header 177 so that the fluid in the bulb is at the line water temperature. For safety and ease of maintenance, the satellite supply header 177 may be equipped with an air vent 189.

In operation, valve 386 and/or its actuator 388 is manually set to close at a maximum temperature of the satellite supply water in header 177. Below that temperature, the valve is modulated open allowing water flow between the main and the satellite stations and so the supply water temperature in header 177 rises. In this way, the satellite water temperature is modulated around the desired medium temperature. Flow meter 191 allows for fine tuning the temperature differential.

In a similar way the temperature of water in satellite 305 supply header 177' is maintained at the low level (80° F.) by the controlled flow of high temperature (160° F.) water from main loop 16 via satellite injection line 392 that feeds from the main loop to the satellite return header 178'. The circulation system for this station includes return header line 73' from return header 178', isolation valve 180' to the low pressure side of pump 181' and from the high pressure side of the pump supply line 172' through isolation valve 179' to supply header 177'. This maintains continuous circulation of the satellite station water between the headers through loops 380.

The temperature of water in satellite 305 supply header 177' is maintained at the low level (80° F.) by the controlled flow of high temperature (160° F.) water from the main loop 16 via satellite injection line 382 that feeds from the main loop 16 to the satellite return header 178. A flow meter 91' on the return header 178' at line 392 acts as a balancing valve for fine tuning the injected flow rate of high temperature water from the main station.

The primary control of the flow of injected high temperature water into satellite station 305 from the main station is in the satellite return line 397. It is from the satellite supply header 177', via thermostatically controlled two-way modulating valve 396 and return line 397 to the main loop 16. Valve 396 is modulated by thermostatic actuator head 398 that is controlled by the temperature of capillary sensor bulb 399 via capillary line 399a from the bulb to the actuator. The bulb is thermally attached to the line 172' into the satellite supply header 177' so that the fluid in the bulb is at the line water temperature. For safety and ease of maintenance, the satellite supply header 177' may be equipped with an air vent 189'.

In operation, valve 396 and/or its actuator 398 is manually set to close at a maximum temperature of the satellite supply water in header 177'. Below that temperature, the valve is modulated open allowing water flow between the main and the satellite stations and so the supply water temperature in header 177' rises. In this way, the satellite water temperature is modulated around the desired medium temperature. Flow meter 191' allows for fine tuning the temperature differential.

Figure 7:
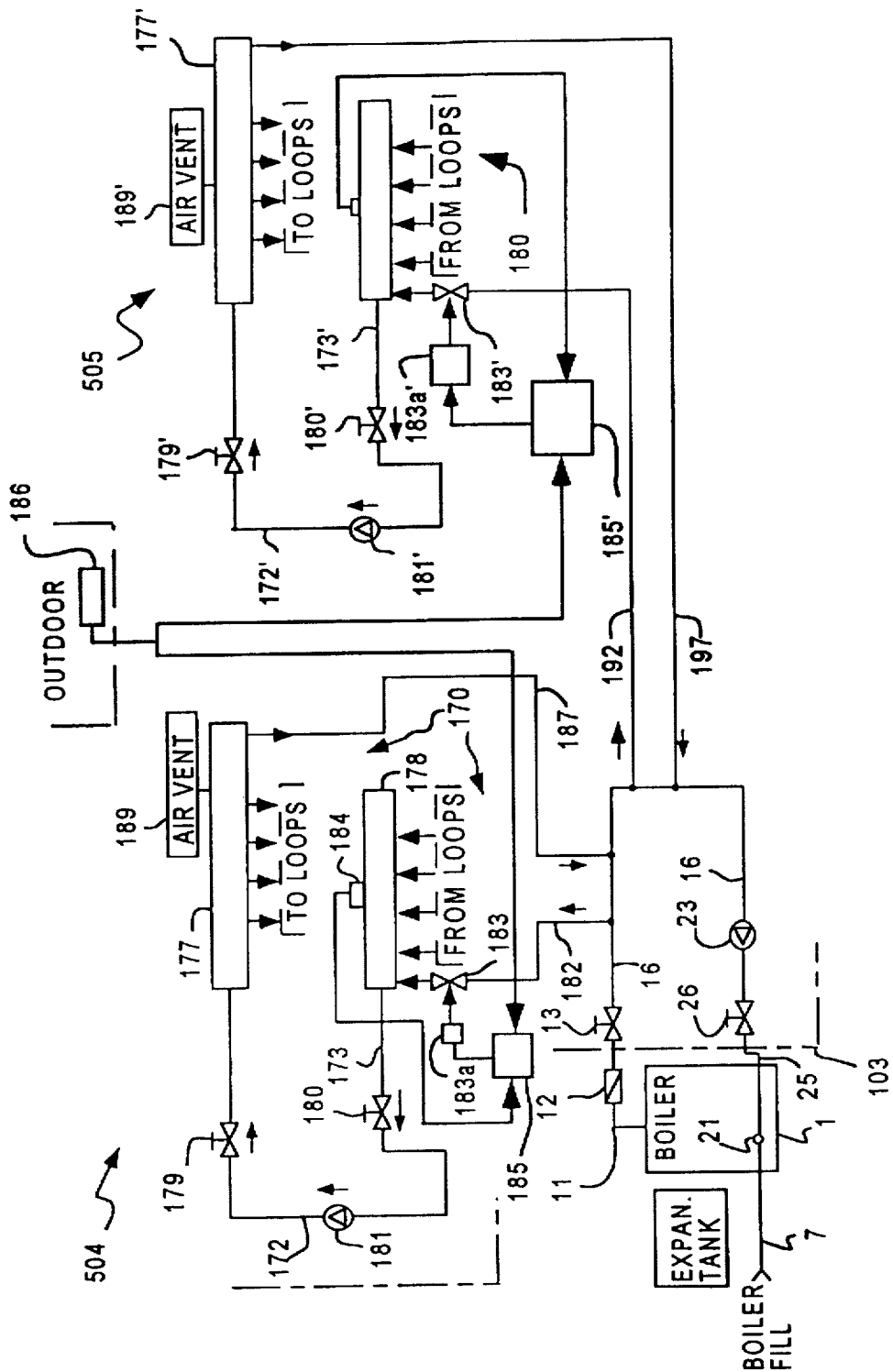
FIG. 7 is a schematic diagram of a hydronic heating system similar to FIG. 1, wherein the insertion water flow control is by a modulated valve in the insertion line from the main that responds to the satellite supply header water temperature and outside ambient temperature.

Main Constant Flow Circulation Loop Feeding Satellites In Series And Satellite Water Temperature Modulated By Feedback And Outdoor Temperature Control As shown in FIG. 7, the main circulation loop 103 is the same as in FIGS. 1 and 2.

The satellite distribution station 504 is set for medium temperature and has a supply header 177 and return header 178 with tubing connections to loops 170. The circulation system for station 103 includes return header line 173 from return header 178, isolation ball valve 180 to the low pressure side of pump 181 and from the high pressure side of the pump supply line 172 through isolation ball valve 179 to supply header 177. This maintains continuous circulation of the satellite station water between the headers through loops 170.

The temperature of water in satellite 504 is maintained at the medium level (135° F.) by the controlled flow of high temperature (180° F.) water from main loop 16 via satellite injection line 182 that feeds from main loop 16 to the satellite return header 178, via solenoid operated (on/off) two-way valve 183. That valve is controlled by the combination of water temperature feedback from the return header, detected by electric temperature transducer 184, and outside ambient temperature, detected by electric temperature transducer 186. The electric signals from those transducers are combined by solenoid control circuit 184, which controls the valve solenoid 83a, thereby controlling the flow of hot injected water into the satellite station. This feed of hot water into the satellite station is referred to herein as BTU water injection. Water return from satellite 104 to the main loop is by small diameter station 104 return line 187 from satellite supply header 177 to the main loop. For safety and ease of maintenance, the satellite supply header 177 may be equipped with an air vent 89.

In operation, solenoid control circuit 185 is set to maintain the satellite return water temperature in header 178 at medium (135° F.) for medium outdoor ambient temperature (about 50° F.), while the main station operates at high temperature (180° F.). Thereafter, when outside temperature drops below 50° F., solenoid valve 183 opens and closes to maintain the satellite water temperature at a slightly higher level to accommodate the increase in BTU flow demand of the loops due to the lower ambient temperature. On the other hand, when outside ambient temperature rises, solenoid valve 183 opens and closes to maintain the satellite water temperature at a slightly lower level to accommodate the decrease in BTU flow demand of the loops due to the higher ambient temperature.

In a similar way, the temperature of water in satellite station 505 is maintained at a predetermined low temperature (90° F.) by controlled injection flow from the main station. Station 505 set for low temperature has a supply header 177' and return header 178' with tubing connections to loops 180. The circulation system includes return header line 173' from return header 178', valve 180' to the low pressure side of pump 181' and supply line 172' through valve 179' to supply header 177', maintaining continuous circulation of satellite station 105 water between the headers through loops 180.

The temperature of water in satellite 505 is maintained at the low level (90° F.) by the controlled flow of high temperature (180° F.) water from main loop 16 via station injection line 192 that feeds from main loop 16 to the satellite return header 178', via solenoid operated (on/off) two-way valve 183', which is controlled by the combination of water temperature feedback from the return header, detected by electric temperature transducer 184', and outside ambient temperature, detected by electric temperature transducer 186. The electric signals from those transducers are combined by solenoid control circuit 185', which controls the valve solenoid 83a, thereby controlling the flow of hot injected water into the satellite station.

Water return from satellite station 505 to the main loop is by satellite return line 197 from supply header 177' to the main loop 16. For safety and ease of maintenance, the satellite supply header 77' may be equipped with an air vent 189'.

In operation, solenoid control circuit 185' is set to maintain the satellite return water temperature in header 178 at low (90° F.) for medium outdoor ambient temperature (about 50° F.), while the main station operates at high temperature (180° F.). Thereafter, when outside temperature drops below 50° F., solenoid valve 183' opens and closes to maintain the satellite water temperature at a slightly higher level to accommodate the increase in BTU flow demand of the loops due to the lower ambient temperature; or when outside ambient temperature rises, solenoid valve 183' opens and closes to maintain the satellite water temperature at a slightly lower level to accommodate the decrease in BTU flow demand of the loops due to the higher ambient temperature.

Main Distribution System With Supply Temperature Control By Dilution Through Temperature Feedback And Outdoor Ambient Temperature Controlled Diverting Valve And Satellites In Series With A Main Loop And Temperature Limit Control On Satellites As shown in FIG. 8, main distribution station 203 includes four heating loops 220, which require supply water temperature at substantially lower than 180° F. and so for those loops, return water is diverted to the loop supply, diluting the boiler supply thereto and so reducing the temperature of the loop supply water to within the required limits. For example, these loops may have a high limit of 160° F.

Main station 203 incorporates a three-way modulated diverting valve in the return line. The boiler supply line 11 to the station includes check valve 12, isolation valve 13, a T connection 14 to diverting line 15 and the continuation 16 of supply line 11 to loop supply header 17 that feeds the several heating loops 220. A separate loop tubing connection to the supply header 17 is provided for each loop. At the other end of each loop a similar tubing connection is provided to the return header 18. The return line from header 18 to the boiler return reservoir 21 includes a first section 22 to water pump 23, three-way modulated diverting valve 24, boiler return line 25 and isolation valve 26.

Three-way modulated diverting valve 24 has one water flow input from pump 23, receiving return water from the heating loops, a first water flow output to the boiler return line 25 and a second water flow output to diverting line 15 that connects to the supply line T connection 14. A suitable structure of diverting valve 24 is shown and described in the applicant's aforementioned U.S. Pat. No. 5,119,988.

Modulation of valve 24 is by a conventional push/release type actuator head adapted herein for dual temperature input in diverting valve control system 36 provides this control action to the valve stem. It is a non-electric, thermostatic, automatic push/release type, dual temperature actuating system 136 for the diverting valve and includes: dual temperature actuator head 161; ratio setter device 171; supply header water temperature thermal sensor bulb 137; capillary line 138 from the sensor bulb to the actuator head; outdoor ambient temperature thermal sensor bulb 158; a capillary line 159 from the sensor bulb to the ratio setter device; and capillary line 160 from the ratio setter device to the actuator head. This control system is also shown and described in the applicant's aforementioned co-pending U.S. patent application Ser. No. 529,938.

The sensor bulbs and capillaries contain a fluid that expands as the fluid temperature increases, delivering additional volume of fluid via the capillaries to the push/release type actuator head 161, which converts the increased fluid volume to a new position of the valve stem. Thus, when the temperature of the fluid in a sensor bulb increases, the valve stem position is changed to increase the diverted water flow and so reduce the temperature of the loop supply header water. In this way, the temperature of the diluted supply water flowing to the loops 220 supply header 17 (feedback temperature), combined with outdoor temperature, according to a selected operating curve is effective to modulate the valve to limit the water temperature as herein described.

Sensor bulb 137 is preferably located so as to detect the temperature of the supply water flow into header 17 that feeds the heating loops. This can be done simply by attaching the sensor bulb in intimate thermal contact with the outside of supply line 16 as shown in FIG. 8. For this purpose, the elongated sensor bulb 37 is oriented longitudinally along line 16 and is secured tightly thereto. A visible temperature gauge 144 is also attached to line 16 close to header 17 so that it displays a temperature as near to the temperature of the diluted supply water as possible. For added safety and ease of maintenance, the supply header 17 may be equipped with an air vent 146. Supply water flow to each of heating loops may be controlled by a balancing valve with an internal position set screw.

The satellite distribution stations 204 and 205 in this embodiment may be the same except for operation. Station 204 may be set for medium temperature, as compared to the main which operates at high temperature and station 205 may be set for low temperature. For example, when high temperature is 160° F., medium may be 120° F. and low may be 80° F.

Station 204 set for medium temperature has a supply header 177 and return header 178 with tubing connections to loops 270. The circulation system for this station includes return header line 173 from return header 178, isolation ball valve 180 to the low pressure side of pump 181 and from the high pressure side of the pump supply line 172 through isolation ball valve 179 to supply header 177. This maintains continuous circulation of the satellite station water between the headers through loops 270.

The temperature of water in satellite 204 supply header 177 is maintained at the medium level (120° F.) by inserted hot water flow from a loop 221 of the main distribution station, the satellite loop. Loop 221 is in series with the satellites 204 and 205 and runs from the main supply header 17 to the main return header 18. The inserted flow to satellite station 204 is via station 204 insertion line 282 that feeds from loop 221 to satellite 204 return header 178. A flow meter 191 on the return header 178 at line 282 acts as a balancing valve regulating the injected flow rate of high temperature water from the main station. This feed of high temperature water into the satellite station is sometimes referred to as BTU water injection.

Water return from satellite station 204 to the main station satellite loop 221 is by satellite 204 return line 287 from supply header 177 to satellite loop 221. For safety and ease of maintenance, the satellite supply header 177 may be equipped with an air vent 189.

In operation, flow meter 191 is manually set to adjust the supply water temperature in header 177 to medium (120° F.) for medium outdoor temperature (about 50° F.) while the main station operates at high temperature (160° F.). Thereafter, when outside temperature drops below 50° F., the main station water high temperature is increased causing a corresponding increase in the medium temperature, (the supply water temperature at satellite station 204), to accommodate the increase in BTU insertion water flow demand of the lower ambient temperature. On the other hand, when outside ambient temperature rises, the main station water high temperature falls, reducing BTU insertion water flow to the satellite station.

In a similar way the temperature of water in satellite 205 supply header 177' is maintained at the low level (80° F.) by the insertion water flow of high temperature (160° F.) water from the main satellite loop 221 via relatively small diameter station 205 insertion line 292 that feeds from loop 221 to the satellite return header 178'. A flow meter 191' on the return header 178' at line 292 acts as a balancing valve regulating the injected flow rate of high temperature water from the main station satellite loop 221.

Water return from satellite station 205 to the main station is by station 205 return line 297 from supply header 177' to the main station return header 18. For safety and ease of maintenance, the satellite supply header 177' may be equipped with an air vent 189'.

In operation, flow meter 191' is manually set to adjust the supply water temperature in header 177' to low (80° F.) for medium outdoor temperature (about 50° F.) while the main station operates at high water temperature (160° F.). Thereafter, when outside temperature drops below 50° F., the main station water high temperature is increased causing a corresponding increase in the low temperature,( the supply water temperature at satellite station 204), to accommodate the increase in BTU flow demand of the lower ambient temperature. On the other hand, when outside ambient temperature rises, the main station water high temperature falls, reducing BTU flow to the satellite station.

CONCLUSIONS

While the invention is described herein in connection with preferred embodiments, it will be understood that it is not intended to limit the invention to those embodiment. It is intended to cover all alternatives, modifications, equivalents and variations of those embodiments and their features as may be made by those skilled in the art within the spirit and scope of the invention as defined by the appended claims.

I claim:

1. A hydronic heating system having a source of hot supply water and a reservoir of cooler return water, a supply water line from said source and a return water line to said reservoir, comprising, (a) a main hot supply water circulation path (loop) from said supply water line to said return water line including a pump maintaining continuous flow of said hot supply water through said main loop, (b) a satellite station distribution system along said main loop including:

(c) a satellite injection water connection along said main loop and a satellite return water connection along said main loop, (d) a satellite heating loop, a satellite supply header and satellite return header at opposite ends of said satellite loop and a satellite station pump having a pump input and a pump output for pumping satellite water from said satellite return header to said satellite supply header, (d) whereby said satellite water flows through said satellite loop from said satellite supply header to said satellite return header, (e) a satellite injection water line from said satellite injection connection along said main loop to said satellite pump input and (f) a satellite return water line from said satellite pump output to said satellite return connection along said main loop, (g) whereby heat from said main loop flows to said satellite loop.

2. A hydronic heating system as in claim 1 wherein, (a) means are provided for modulating said heat flow from said main loop to said satellite loop.

3. A hydronic heating system as in claim 1 wherein, (a) said heat flow to said satellite loop is carried by water flow through said injection water line and (b) means are provided for modulating said injection line water flow.

4. A hydronic heating system as in claim 3 wherein, (a) said means for modulating said injection line water flow is a modulated valve in said satellite station.

5. A hydronic heating system as in claim 3 wherein, (a) said means for modulating said injection line water flow is a thermostatically modulated valve in said satellite station.

6. A hydronic heating system as in claim 4 wherein, (a) said modulated valve is in said return water line.

7. A hydronic heating system as in claim 3 wherein, (a) said modulated valve in said satellite station feeds water from said satellite station to said satellite return water line.

8. A hydronic heating system as in claim 1 wherein, (a) said satellite injection water connection along said main loop, said satellite return water connection along said main loop, said satellite station pump, said satellite injection water line from said satellite injection connection along said main loop to said satellite pump input and said satellite return water line from said satellite pump output to said satellite return connection along said main loop are provided as a modular unit that is interchangeable between satellite stations.

9. A hydronic heating system as in claim 1 wherein, (a) an isolation valve for a satellite is provided along said main loop between said satellite injection water connection along said main loop and said satellite return water connection along said main loop.

10. A hydronic heating system as in claim 9 wherein, (a) said isolation valve for a satellite is part of said satellite station modular unit.

11. A hydronic heating system as in claim 7 wherein, (a) said modulated valve in said satellite station that feeds water from said satellite station to said satellite return water line is in said return water line and (b) is a two-way valve having means attached thereto for modulating said valve depending on the temperature of said return water in said return water line.

12. A hydronic heating system as in claim 11 wherein, (a) said two-way modulated valve in said satellite return water line is thermostatically controlled, (b) said means attached thereto for modulating said valve depending on the temperature of said return water in said return water line is a thermostatic actuator and (c) a thermostatic temperature detector in thermal connection with said return water in said return water line is connected to said thermostatic actuator, (d) whereby thermostatic fluid in said detector and said actuator exerts a force that positions said valve depending on said return water temperature.

13. A hydronic heating system having a boiler providing hot supply water and a reservoir of cooler return water, a boiler supply water line and a boiler return water line to said boiler reservoir, comprising, (a) a main loop fed boiler supply water by said boiler supply line, a main water pump compelling water flow through said main loop from said boiler supply line to said boiler return water line, (b) a satellite distribution station feeding one or more satellite station heating loops, (c) a satellite injection water connection along said main loop and a satellite return water connection along said main loop, (d) said satellite distribution station including a satellite heating loop supply header and satellite heating loop return header at opposite ends of said satellite loop and a satellite station pump pumping satellite water from said satellite return header to said satellite supply header, (e) whereby heat from said main loop flows to said satellite loop.

14. A hydronic heating system as in claim 13 in a premises having a boiler room and other rooms that are heated by said satellite station heating loops, wherein, (a) said boiler and main loop are located in said boiler room and said satellite heating loops have parts thereof that are in said other rooms.

15. A hydronic heating system as in claim 14 wherein, (a) said satellite station distribution system along said main loop includes:

(c) a satellite injection water connection along said main loop and a satellite return water connection along said main loop, (d) a satellite heating loop, a satellite supply header and satellite return header at opposite ends of said satellite loop and a satellite station pump having a pump input and a pump output for pumping satellite water from said satellite return header to said satellite supply header, (d) whereby said satellite water flows through said satellite loop from said satellite supply header to said satellite return header, (e) a satellite injection water line from said satellite injection connection along said main loop to said satellite pump input and (f) a satellite return water line from said satellite pump output to said satellite return connection along said main loop, (g) whereby heat from said main loop flows to said satellite loop.

16. A hydronic heating system as in claim 15 wherein, (a) means are provided for modulating said heat flow from said main loop to said satellite loop.

17. A hydronic heating system as in claim 15 wherein, (a) said heat flow to said satellite loop is carried by water flow through said injection water line and (b) means are provided for modulating said injection line water flow.

18. A hydronic heating system as in claim 17 wherein, (a) said means for modulating said injection line water flow is a modulated valve in said satellite station.

19. A hydronic heating system as in claim 17 wherein, (a) said means for modulating said injection line water flow is a thermostatically modulated valve in said satellite station.

20. A hydronic heating system as in claim 18 wherein, (a) said modulated valve is in said return water line.

21. A hydronic heating system as in claim 18 wherein, (a) said modulated valve in said satellite station feeds water from said satellite station to said satellite return water line.

22. A hydronic heating system as in claim 15 wherein, (a) said satellite injection water connection along said main loop, said satellite return water connection along said main loop, said satellite station pump, said satellite injection water line from said satellite injection connection along said main loop to said satellite pump input and said satellite return water line from said satellite pump output to said satellite return connection along said main loop are provided as a modular unit that is interchangeable between satellite stations.

* * * * *